United States Patent [19]
Hogue et al.

[11] 3,894,245
[45] July 8, 1975

[54] AUTOMATICALLY RESPONSIVE STORED ENERGY MECHANISM FOR OPENING AND CLOSING AN ELECTRICAL SWITCH

[75] Inventors: Maurice A. Hogue; James E. McClain; Howard L. Scott, all of Greenville, Tex.

[73] Assignee: ESCO Manufacturing Company, Greenville, Tex.

[22] Filed: Nov. 23, 1973

[21] Appl. No.: 418,384

[52] U.S. Cl. .............................. 307/124; 200/153 L
[51] Int. Cl. ............................................. H01h 3/16
[58] Field of Search......... 307/124, 120; 200/153 R, 200/153 G, 153 L, 153 LB, 153 N, 153 SC; 317/24, 28 R

[56] References Cited
UNITED STATES PATENTS
2,846,621  8/1958  Coggeshall.................... 200/153 SC Primary Examiner—Robert K. Schaefer
Assistant Examiner—M. Ginsburg
Attorney, Agent, or Firm—Kenneth R. Glaser

[57] ABSTRACT

Disclosed is switch operator apparatus automatically responsive to remotely generated electrical "switch open" and "switch close" command signals for respectively and alternately opening and closing a switch mechanically coupled to the switch operator. The switch operator includes a rotatably mounted main operating shaft having the requisite torque applied thereto for opening and closing the switch by a stored energy mechanism formed by a rotatably driven drum internally coupled to the shaft by a spiral spring assembly; a releasable, tripable latch assembly for preventing, and limiting the degree of, rotation of the shaft; and a torque responsive control assembly for deactuating the stored energy mechanism when a predetermined maximum torque is applied to the shaft and for locking out the trip release mechanism when a predetermined minimum torque exists.

12 Claims, 7 Drawing Figures

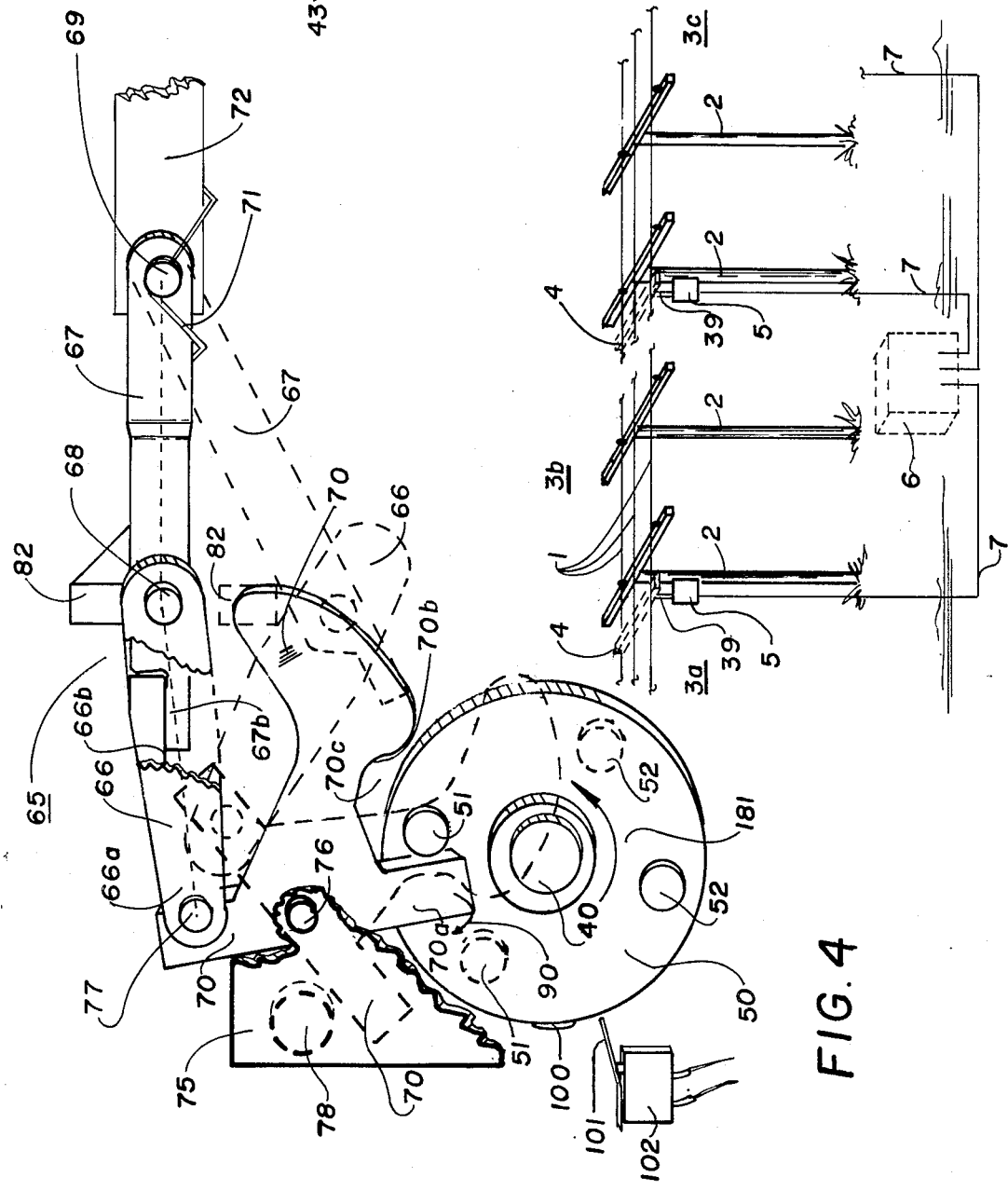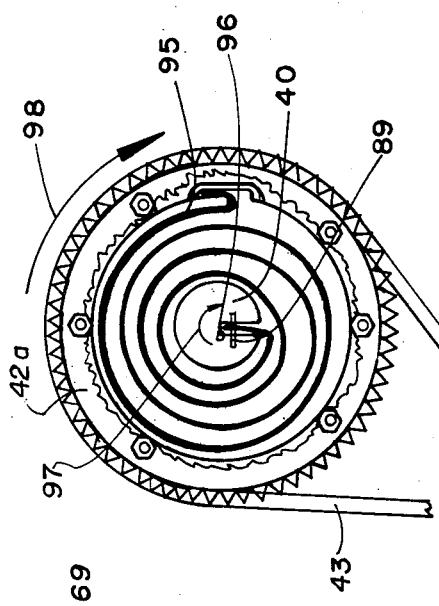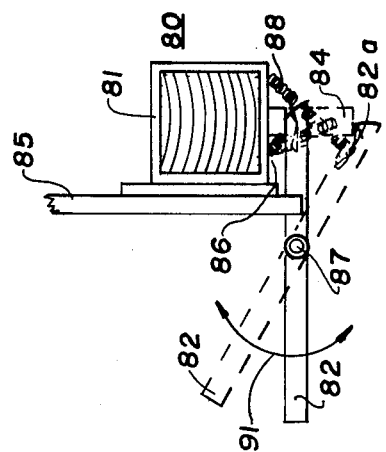

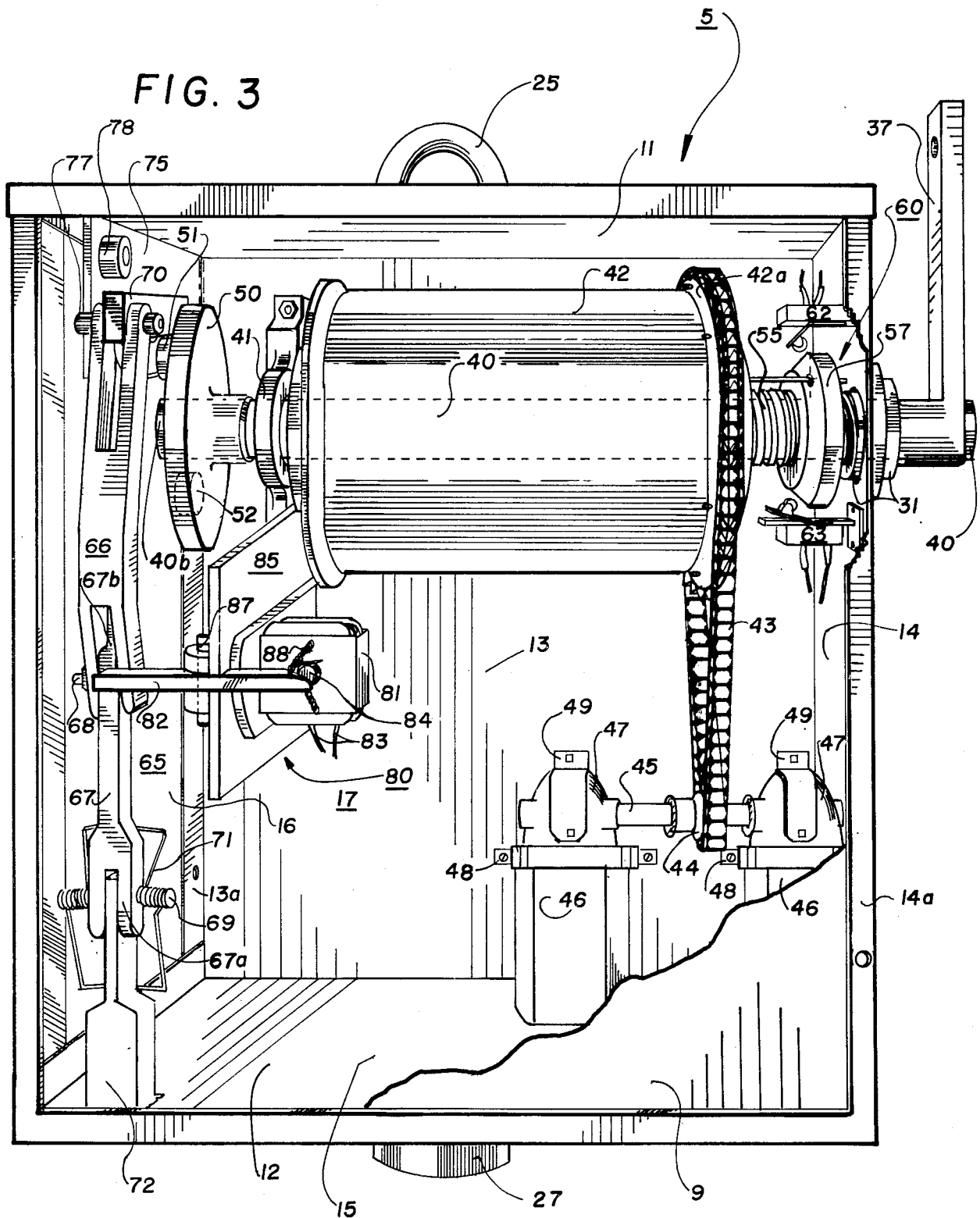

AUTOMATICALLY RESPONSIVE STORED ENERGY MECHANISM FOR OPENING AND CLOSING AN ELECTRICAL SWITCH

This invention broadly pertains to high voltage electrical power distribution systems, more particularly to remote controlled switching in overhead electrical power distribution systems, and even more particularly to stored energy controlled switch operators for responsively opening and closing switches incorporated in such power distribution systems.

High voltage electric power distribution systems typically include switches for isolating or sectionalizing certain segments of the distribution system upon the occurrence of faults therein and "switch operators" operatively coupled with the switches to effect the requisite switching functions. In many applications, for example in the case of an overhead power distribution system, the relative inaccessibility of the switches requires that means be provided for remotely opening the switches in response to the fault and closing same upon correction of the fault to restore normal service.

Early switch operators for effecting these remote opening and closing operations often involved the use of a long insulating rod for manually operating the switch to its desired mode. The inherent inconvenience of this approach has more recently resulted in attempts to develop switch operators which can be respectively disposed near the switches which they are to operate, for example upon the power line pole in the case of an overhead distribution system, each switch operator then being remotely electronically controlled from a central station conveniently located at ground level. While this approach affords considerable advantages over the manual operation of the switch, as previously described, its success depends upon the development of a suitable switch operator, having, among other things, economic construction, efficient operation, and compatibility with both the switch which it is adapted to operate and the central station (or distribution operator) with which it is in electrical communication.

It is therefore a primary object of the invention to provide a new and improved switch operator.

It is another object of the invention to provide a switch operator of the type to be employed in the remote controlled opening and closing of switches in an electrical power distribution network.

It is a still further object of the invention to provide a new and improved remote controlled, stored energy operated switch operator for responsively opening and closing a mechanically coupled switch in an overhead power distribution system.

In accordance with these and other objects, the present invention is directed to a switch operator automatically responsive to remotely generated electrical "switch open" and "switch closed" command signals for respectively and alternately opening and closing a switch mechanically coupled to the switch operator. The switch operator itself comprises a rotatably mounted main operating shaft having a rigidly coupled operating arm mechanically linked with the switch; a stored energy mechanism for imparting torque to, and thus enabling the rotation of, the main operating shaft; a releasable latch assembly uniquely coupled to the main operating shaft which not only prevents the rotation of the shaft until the receipt of the appropriate command signals, but limits the degree of the rotation of the shaft to effect only the discrete opening or closing operation. In accordance with one of the unique features of the switch operator of the invention, control means responsive to the existing torque on the main operating shaft regulates the number of open-close cycles of the operator as well as the maximum extent of the torque to be applied to the shaft.

Additional features, as well as further objects and advantages, of the invention will become more readily understood from the following detailed description taken in conjunction with the attached drawings, wherein identical numerals refer to similar parts, and wherein:

FIG. 1 is a diagrammatic representation of an overhead power distribution system employing the remote controlled switch operator of the present invention;

FIG. 3 is an overall front view of the switch operator apparatus of the present invention with the housing cover removed for convenient viewing of the apparatus within the housing;

FIG. 4 illustrates, in greater detail, the releasable latch assembly of the switch operator depicted in FIG. 3, and operation thereof;

FIG. 5 illustrates, in greater detail, the latch tripping assembly of the switch operator depicted in FIG. 3, and operation thereof;

Figure 7:
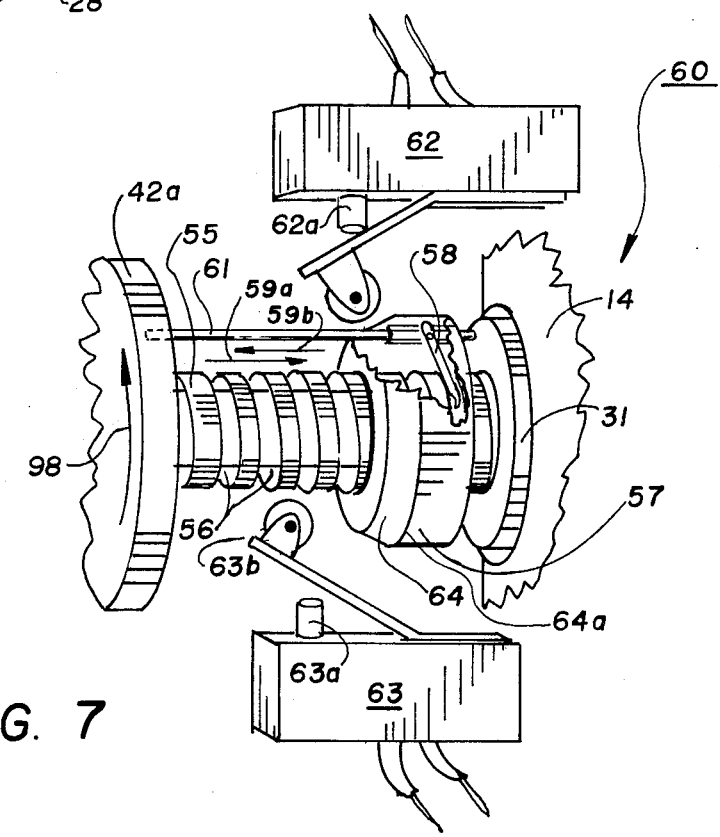

FIG. 6 is an end view of the spring drum housing of the stored energy mechanism of the switch operator depicted in FIG. 3, with a portion of the end plate of the housing depicted as being partially broken away in order to provide convenient viewing thereof; and FIG. 7 illustrates, in greater detail, the torque responsive control assembly of the switch operator depicted in FIG. 3, and operation thereof.

Referring now to the drawings, a typical overhead high voltage electrical power distribution system can be represented as in FIG. 1 as including three-phase power lines 1 disposed above the ground by conventional upright power line poles 2. These power lines would normally be coupled at their remote ends to respective power generating stations; load means, such as the utility service entrance of a residence or the like, being coupled at various spaced locations along the length of the lines. The distribution system is segmented by normally-closed switches 4 into adjacent sections, for example 3a, 3b, 3c, etc., each section possibly being several miles in length, for example. Thus, upon the occurrence of a fault in one of the sections, for example section 3b, the switches 4 interconnecting this section with the adjacent sections 3a and 3c can be opened, thus isolating the faulted section from the remainder of the system. Upon correction of the fault, the switches 4 are then reclosed and service restored to the previously faulted section.

The opening and closing of the switches 4 is effected, as subsequently described, by the switch operator 5 of the present invention. Accordingly, each switch operator 5 will be selectively mounted on power line poles 2 adjacent its switch 4 and respectively mechanically coupled thereto by a mechanical linkage 39 which, when vertically translated between upper and lower positions by the operator 5, closes and opens the switch 4. As subsequently described, this vertical translation, for example, is effected in response to electrical command signals received from a central distribution operator station 6 disposed at ground level, the command signals being conveyed to the switch operators 5 by way of data communication channels 7. Furthermore, the communication channels 7 not only serve to convey the "open" or "close" command signals from the distribution operator station 6, but to transmit electrical signals from each of the switch operators 5 to that station indicative of the status (open or closed) of the coupled switch.

Figure 2:
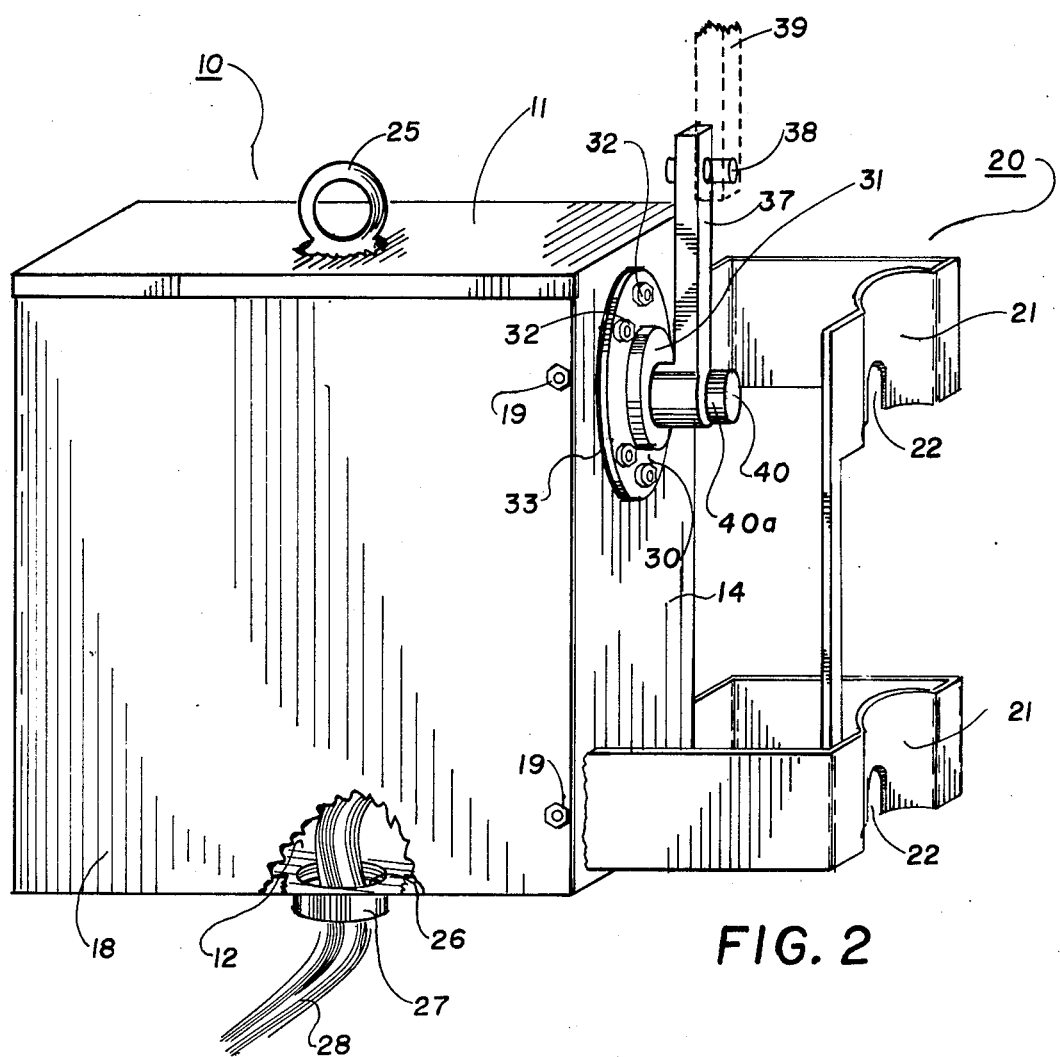
FIG. 2 is a perspective view of the housing of the switch operator of the present invention illustrating the means for mounting the housing and the mechanical interconnection of the operator with one of the switches depicted in FIG. 1.

Referring now to FIGS. 2 and 3, a generally rectangular shaped housing 10 for enclosing the switch operator 5 of the present invention comprises respective top and bottom panels 11 and 12; rear panel 13; and right side panel 14. Front and left side openings 15 and 16 (FIG. 3) provide access to an interior compartment 17 defined by the housing 10; a removable cover 18 being provided to close off these openings, as depicted in FIG. 2. The cover 18 may be mounted in any suitable manner, for example by bolts 19, to a flanged extension 14a of the panel 14, as well as to a similar flanged extension 13a of the rear panel 13.

Secured, by welding for example, to the end panel 14 is a bracket 20 for mounting the operator housing to the pole (for example poles 2 of FIG. 1) carrying the overhead power lines 1. Accordingly, the bracket 20 includes contoured portions 21 of a shape and contour sufficient to fit the contour of the side of each power line pole, slots 22 being provided therein to enable the bracket (and consequently the housing) to be hung on the pole 2 by way of a pair of preinstalled extensions or bolts, the ends of which would be received within the slots 22.

Centrally disposed at the top panel 11 of the housing and affixed thereto, by welding for example, is an eye member 25 which enables the lifting of the housing to the installation height on the power line pole. Additionally, an opening 26 located in the base panel 12 and having a circular flange 27 extending from, and surrounding, the opening, is provided to enable the passage therethrough of a flexible cable 28, the cable 28 being electrically coupled between the remote distribution operator station 6 and a control panel 9 disposed within the housing. The cable 28 thus provides the two-way data communication channel 7 between the switch operator 5 and station 6.

A mounting plate 30 having a hub 31 is secured to the end panel 14 by way of bolts 32, a gasket 33 being disposed therebetween, the hub 31 extending through an opening in the panel 14 (FIG. 3). Journaled for rotation within the hub bearing 31 is a main operating shaft 40. Rigidly affixed to an end 40a of the shaft 40, and thus adapted to rotate therewith, is an operating arm 37. This operating arm is coupled, by way of bolt 38 for example, to the linkage 39 of the switch 4. Rotation of the shaft 40 (and consequently the arm 37) in accordance with the subsequently described operation of the switch operator 5 will then vertically translate the linkage 39 between an uppermost and lowermost position respectively representing and causing the closed and open condition of the switch 4.

Referring now to FIGS. 3 – 7, the detailed construction and operation of a preferred embodiment of the switch operator 5 in accordance with the principles of the present invention is now described. Specifically, and with initial reference to FIG. 3, the main operating shaft 40 extends through the housing interior 17 in a direction generally parallel to the top and bottom panels 11 and 12 and is journally supported not only by the hub 31, as previously described, but also by a pillow block 41 rigidly coupled to the rear panel 13.

The so-supported main operating shaft axially extends through the center of, and is adapted to rotate with respect to, a spring housing or drum 42. The drum forms an integral part of an overall stored energy mechanism for imparting torque to the main operating shaft to enable the shaft (and consequently the operating arm 37) to rotate. As subsequently described in greater detail, the drum 42 is internally coupled to the shaft 40 by a spring assembly which applies this torque to the shaft as the drum is rotated with respect thereto.

Rotation of the drum housing 42 is effected by a chain 43 engaging a sprocket wheel 42a bolted to, and forming the end plate of, the drum housing. The chain 43 is, in turn, driven by, and is coupled by way of sprocket gear 44 to, a shaft 45 rotatably driven by motor means which, in the illustrated embodiment, comprises a pair of tandemly connected motors 46 coupled to the shaft 45 by way of gear boxes 47. The motors 46 and gear boxes 47 are mounted to the rear panel 13 by way of brackets 48 and 49, respectively. The motors 46 are normally powered from a convenient source, such as the main line voltage, and thus are effective to continuously rotate the drum 42 except upon loss of this line voltage or when operatively deactuated by the control mechanism 60, as subsequently described.

Rigidly coupled at an end 40b of the shaft 40 to thereby rotate therewith is a disc 50 having diametrically opposed bosses 51 and 52 extending therefrom. Disposed at the left side of the compartment 17 is a latch assembly adapted for releasable engagement with one or the other of these bosses or projections 51 and 52. This latch assembly is effective, when so engaged, to prevent the rotation of the shaft 40, as well as to limit the degree of shaft rotation after release.

Specifically, and with reference to FIGS. 3 and 4, the latch assembly comprises a knuckle mechanism 65 having respective upper and lower arms 66 and 67 hingedly coupled by pivot pin 68 extending through mutually aligned openings in the ends of the arms 66 and 67; the lower arm 67 being pivotally mounted at its end 67a by pin 69 to a support 72.

Pivotally mounted by way of pin 76 to a support bracket plate 75 (which extends from and is joined at the rear panel 13) is a latch plate 70 having a latch finger or extension 70a, cam surface portion 70b, and a cut-out 70c therebetween. The latch plate 70 is pivotally coupled to the forward end 66a of the arm 66 by way of pivot pin 77. Thus, the knuckle assembly 65 (arms 66 and 67) is pivotally movable between an over-pivoted or "locked" position (depicted by the solid line representation in FIG. 4) and an "unlocked" position (depicted by the dashed line representation in FIG. 4); spring means 71 biasing the arm 67 (and consequently the hinged arm 66) toward the over-pivoted or "locked" position. The arm 67 has an extension 67b adapted to engage an internal wall 66b of the arm 66 when in this locked position, the interior surface 66b thus serving as a stop to limit the over-pivoting of the knuckle mechanism.

The latch plate 70 is also pivotally movable between a "latched" position (represented by its solid line representation of FIG. 4) and an "unlatched" position (dashed line representation). When the knuckle assembly 65 is in its over-pivoted or locked position, the plate 70 is consequently held in its "latched" position; and the latch finger extension 70a retains one of the projections (for example 51) within the cut-out 70c. The disk 50 (and thus the shaft 40) is consequently restrained from rotation. On the other hand, when the knuckle arms 66 and 67 are pivoted into their "unlocked" position, thus releasing the latch plate 70, the existing torque on the shaft 40 rotates the disc in the direction of arrow 181, pivoting the latch finger 70a in the direction of arrow 90 and out of engagement with the projection 51 toward the "unlatched" position, a stop 78 being provided to limit the pivotal rotation of the latch plate, the shaft 40 thus being freed for rotation. When the projection 51 clears the latch finger 70a (dashed line representation), the spring 71 returns the knuckle assembly 65 to its over-pivoted or "locked" position; the plate 70 is consequently returned to its latched position; and the diametrically opposed projection 52 (which is rotated to the previous position of projection 51) is now captured within the cut-out 70c by the finger 70a. During its rotational advancement, the projection 52 will normally engage the cam surface 70b and assist the return, by the resulting camming action, of the latch plate 70 to this latched position. In this regard, the stop 78 is positioned to so limit the pivotal rotation of the plate 70 so that the cut-out 70c is always presented to the new projection (51 or 52) being rotatably advanced. Since the projections 51 and 52 are diametrically opposed, release of the latch plate 70 not only enables the shaft 40 (and coupled handle 37) to be released for rotation; but the return of the plate 70 limits the degree of consequent rotation through, and only through, a 180° arc.

The release of the knuckle assembly 65 from its "locked" to "unlocked" positions, as previously described, is effected by a trip release assembly 80 comprising solenoid means 81 and an operatively coupled trip lever 82. The solenoid 81, which can be of conventional construction, is mounted to a support bracket 85 extending from the rear panel 13, and includes leads 83 for receiving the previously mentioned command signals for energizing the solenoid and projecting the solenoid plunger 84 against the end 82a of the trip lever 82, spring means 86 aiding in retracting the plunger when the solenoid (coil) is de-energized. The trip lever 82 is pivotally mounted to the plate 85 by way of a pivot pin 87 to enable the pivotal movement of the bar 82 in the direction illustrated by the arrows 91 between a "non-tripped" position (represented by solid lines in FIGS. 4 and 5) and a "tripped" position (dashed line representation of FIGS. 4 and 5). Thus, when the solenoid is energized, the solenoid plunger 84 pivots the trip lever 82 in the clockwise direction shown in FIG. 5 to its tripped position, which consequently pivots the arm 67 out of its over-pivoted condition, unlocking the knuckle assembly 65, and releasing the latch plate, as previously described. Upon de-energization of the solenoid coil (absence of command signal at leads 83) a spring 88 coupled to the trip arm 82 returns the trip arm to its nontripped position, the plunger 84 being consequently retracted.

As previously briefly mentioned, the torque for rotating the main operating shaft 40 is supplied by the stored energy level of a spring assembly coupling the drum 42 with the shaft. Referring to FIG. 6 the spring assembly is provided by a plurality of coiled or spiral springs 95 (one of which is shown in FIG. 6) laterally spaced along, and surrounding, the axially extending shaft 40. While one extremely strong spring 95 may be so employed, the provision of a number, for example eight, of such springs allows a certain degree of redundancy in the event of spring breakage. As indicated, one end of each coil spring 95 would be affixed by a pin 89, for example, in a longitudinally extending slot 96 in the shaft 40, the other end of the spring being rigidly attached at the inner surface of the drum 42, as pictured. Thus, when the drum housing 42 is rotated by chain 43 (in the direction of the arrow 98), the coiled or spiral spring 95 is consequently wound and the resulting spring energy will cause the shaft 40, when freed for rotation, to be rotated in the clockwise direction of arrow 97.

In accordance with a unique feature of the present invention, an automatic control mechanism 60 for regulating the maximum and minimum amount of torque respectively applied to, or maintained on, the main operating shaft 40, and consequently the number of open-close cycles of the switch operator 5, is disposed at the shaft between the drum housing 42 and the side panel 14. Accordingly, and with reference to FIGS. 3 and 7, a cylindrically shaped sleeve 55, formed of nylon for example, is rigidly affixed to, for rotation with, the main operating shaft 40. Disposed around the periphery of the sleeve 55 is a continuous groove 56 of helical configuration which has been machined out of, or formed in, the surface of the sleeve, the helical groove having a convenient number of turns, for example two and one half turns per inch.

The sleeve 55 is journaled for rotation within a "memory" disc 57 disposed around, and also mounted for translatable movement along, the sleeve 55. A follower pin 58 extending internally of, and rigidly coupled to, the disc 57 has an end portion received within the helical groove 56. Thus, as a consequence of this coupling between the disc and sleeve, relative rotation of the memory disc 57 and the cylindrical sleeve 55 with respect to one another translates the disc 57 along the sleeve 55 in the directions of either the arrows 59a or 59b. Additionally, a rod 61 rigidly coupled to the end plate 42a of the drum 42 and slideably received within a longitudinally extending opening or channel in the disc 57 provides for the rotation and enables the translation of the memory disc 57 with respect to the sleeve 55 when the drum is rotated in the manner previously described.

Thus, it can be seen, particularly from the view of FIG. 7, that when the shaft 40 is rotated in the clockwise direction shown in FIG. 6, the memory disc 57 will be translated in the direction of the arrow 59a toward the side panel 14; and when the drum is rotated in the clockwise direction (shown by the arrow 98), the memory disc 57 is translated in the direction of arrow 59b. Thus, the movement of the disc 57 in the direction of arrow 59a is indicative of the expense of spring energy or torque as a consequence of the shaft rotation; while the movement of the disc 57 in the direction of the arrow 59b is indicative of the restoration of torque to the shaft 40. By disposing a pair of limit switches 62 and 63 at laterally spaced locations in the path of travel of the memory disc, respective switching operations may be effected at predetermined maximum (leftmost) and minimum (rightmost) torque conditions.

Specifically, "maximum condition" limit switch 63 has a switch plunger 63a which is depressed by the engagement of an actuator mechanism 63b with the sloped surface 64 of the disc so that when the edge 64a reaches a leftmost position, for example, the switch 63 is actuated. Actuation of this switch then operatively disengages the motors 46 from further rotation of the drum 42, thus preventing the imparting of additional torque to the shaft.

Similarly, to maintain a predetermined minimum amount of torque on the shaft 40, a limit switch 62 is provided which, when actuated by extension of the switch plunger 62a when the edge 64a passes a rightmost position as the disc moves in the direction of 59a, disengages or locks out the solenoid 81 (by means not shown) so that receipt of additional "open" or "close" command signals will not actuate the trip release mechanism 80 until additional torque has been applied to the shaft. Thus, the lateral position of the disc 57 not only establishes the limits of operation of the switch operator, but by viewing or sensing the relative position of the disc between these limit points gives an indication of the number of open-closed cycles available.

Various types of conventional electronic circuitry may be employed with, and to effect the operation of, the switch operator 5. For example, the "trip" signal to the solenoid 81 by way of leads 83 may be generated by, and occur as a consequence of, the firing of an SCR triggered into conduction as a consequence of the charging of a capacitor in response to the generation of a "close" or "open" command signal from the distribution operator station 6. Similarly, the switch 62 may be coupled to, for lockout of the "trip" signal to, the solenoid; while switch 63 may be electrically connected to interrupt the power to the motors 46 or to disengage the motors from driving relationship with the shaft 45. The internal circuitry would normally be disposed and interconnected upon a control panel 9 (FIG. 3) within the switch operator housing having input and output terminals in appropriate connection with the external cable 28.

There is now summarized the overall operation of the switch operator 5 for effecting one cycle of operation, for example operating a switch 4 from "closed" to "open."

Accordingly, when the switch 4 is closed, the operating handle 37 will normally be in the straight up or 12 o'clock position depicted in FIG. 2, the mechanical linkage 39 thereby being in its uppermost or "switch closed" position. Thereafter, to effect the opening of the switch 4, a command signal is generated from the distribution operator station 6, which results in the "trip" signal being applied to the input terminals 83 of the solenoid 81. As a consequence, the trip release lever 82 is pivoted to unlock the knuckle assembly 65, thereby releasing the disc 50 from its latched engagement, and the operating shaft is rotated 180° until the operating arm 37 extends vertically downward or in the 6 o'clock position. This rotation consequently translates the mechanical link 39 to its lowermost position, thus opening its coupled switch 4. The shaft 40 (and operating arm 37) is then latched in this open position as a consequence of the recapture of the projection 52 which has rotated to be engaged by the latch plate 70. Reclosing of the switch is then effected by receipt of another command signal which then, as before, rotates the main operating shaft (and handle 37) back to the 12 o'clock position. Thus, alternate discrete openings and reclosings are effected. Referring to FIG. 4, a projection 100 may be disposed, if desired, on the periphery of the disc 50 to engage an actuating mechanism 101 of a line status switch 102 as the shaft 40 is rotated, which thus gives a convenient indication of the "open" or "closed" status of the switch.

Assuming that, at the initiation of the "switch open" operation, the internal spring 95 was fully charged and the memory disc 57 at its leftmost position, the previously described 180° rotation of the shaft 40 will consequently translate the memory disc 57 toward the panel 14 in the direction of the arrow 59a (FIG. 7). Thereafter, and assuming that power is being supplied to the motors 46, the drum 42 will be rotated to restore the previously expended torque to the shaft. As a consequence, the memory disc 57 will be translated back to its initial "fully charged" position; and the limit switch 63 tripped to prevent further rotation of the drum 42 and the consequent addition of torque to the shaft.

On the other hand, if the power to the motors 46 has been interrupted, additional operation cycles may still be achieved due to the residual torque remaining on the shaft. The remaining number of operating cycles (open, close, open, etc.) is dependent upon the distance of the memory disc 57 from the "lockout" limit switch 62. For example, if the control mechanism 60 (disc 57 and switches 62, 63) had originally been calibrated for a total of four such cycles, the switch operator may go through three additional cycles (close, open, and close) before the lockout limit switch 62 prevents additional actuation of the trip mechanism coupled to the latch assembly.

Various modifications to the disclosed embodiment, as well as alternate embodiments, may become apparent to one skilled in the art without departing from the spirit and scope of the invention as defined by the appended claims.

What is claimed is:

1. A remote controlled switch operator apparatus for responsively and sequentially opening and closing an electrical switch, comprising:
  a. a rotatably mounted main operating shaft adapted for mechanical coupling with said switch;
  b. first means for imparting torque to said main operating shaft to urge said shaft into rotation; said first means comprising:
   drum means surrounding, and mounted to rotate with respect to, said main operating shaft,
   a spring assembly operatively coupled with said drum means and said main operating shaft, and drive means, when actuated, for rotating said drum means with respect to said shaft, thereby to cause said spring assembly to impart torque to the said main operating shaft;
  c. second means mounted to rotate with said operating shaft, said second means including a pair of stops circumferentially disposed around said shaft;
  d. latch means releasably and separately engaging each of said stops;
  e. trip release means operatively coupled to said latch means for releasing said latch means from engagement with one of said stops in response to a first electrical signal, and returning said latch means to releasable engagement with the other of said stops;

and thereafter releasing said latch means from engagement with the other stop in response to a second electrical signal and returning said latch means to releasable engagement with the one stop, thereby to limit the unrestrained rotation of said shaft to first and second discrete angular positions, the degree of rotation of said shaft between said first and second angular positions being less than a full revolution; and f. control means responsive to the extent of torque on said operating shaft for deactuating said drive means when said torque is at a first predetermined amount and for preventing the release of said latch means when said torque is at a second predetermined amount less than said first predetermined amount.

2. The switch operator apparatus as defined by claim 1 wherein said latch means comprises a knuckle assembly pivotally movable between locked and unlocked positions; and latch plate means including a latching finger extension for respectively engaging, and being released from engagement from, said stops when said knuckle assembly is in said locked and unlocked positions.

3. The switch operator apparatus as defined by claim 2 wherein said stops are in diametrically opposed relationship on said second means.

4. The switch operator apparatus as defined by claim 3 wherein said trip release means comprises a trip lever pivotally actuated in response to said first and second electrical signals to unlock said knuckle assembly.

5. The switch operator apparatus as defined by claim 1 wherein said control means comprises:
 a. a cylindrical sleeve rigidly coupled to, for rotation with, said rotatably mounted main operating shaft, said sleeve having a peripherally defined, helical groove;
 b. memory disc means disposed around, and mounted for reciprocal translation along, said sleeve;
 c. follower means having one end rigidly coupled with said memory disc means and having an opposed end received within said helical groove;
 d. means coupling said drum means with said memory disc means for rotating said disc means around said main operating shaft when said drum means is rotated;
 e. first switch means deactuating said drive means when said memory disc means is translated to one location along said sleeve; and
 f. second switch means preventing the release of said latch means when said memory disc means is translated to a second location laterally spaced from said one location.

6. A switch operator apparatus responsive to remotely generated first and second electrical command signals for respectively and sequentially opening and closing an electrical switch, comprising:
 a. a rotatably mounted main operating shaft;
 b. means mechanically coupling said main operating shaft with said switch in a manner whereby the rotation of said main operating shaft through one complete revolution sequentially opens and closes said switch;
 c. a stored energy mechanism for imparting torque to said main operating shaft, thereby to urge said shaft, when released, into rotation;
 d. a latch assembly means releasably retaining said main operating shaft from rotation as well as limiting the degree of unrestrained rotation of said operating shaft during said one complete revolution to first and second discrete angular positions within said revolution;
 e. trip release means releasing said latch assembly means from retaining relationship with said main operating shaft in response to said first command signal and returning said latch assembly means to said retaining relationship when said main operating shaft has rotated to said first discrete angular position, said trip release means furthermore releasing said latch assembly means from said retaining relationship in response to said second command signal and returning said latch assembly means to said retaining relationship when said main operating shaft as rotated to said second discrete angular position, thereby to respectively open and close said switch at said first and second discrete angular positions; and
 f. control means for limiting the maximum amount of torque imparted to the said main operating shaft as well as limiting the amount of torque removed from said shaft.

7. The switch operator apparatus as defined by claim 6 wherein said latch assembly means comprises a knuckle assembly pivotally movable between locked and unlocked positions; disc means rigidly coupled to, for rotation with, said main operating shaft, said disc means having latch engaging extensions; and latch plate means for respectively engaging, and being released from engagement from, said latch engaging extensions when said knuckle assembly is in said locked and unlocked positions.

8. The switch operator apparatus as defined by claim 7 wherein said latch engaging extensions are in diametrically opposed relationship on said disc means.

9. The switch operator apparatus as defined by claim 8 wherein said trip release means comprises a trip lever pivotally actuated in response to said first and second command signals to unlock said knuckle assembly.

10. The switch operator apparatus as defined by claim 6 wherein said stored energy mechanism comprises:
 a. drum means surrounding, and adapted to rotate with respect to, said main operating shaft;
 b. a spring assembly operatively coupled with said drum means and said main operating shaft; and
 c. drive means, when actuated, for rotating said drum means with respect to said shaft, thereby to cause said spring assembly to impart torque to the said main operating shaft.

11. The switch operator apparatus as defined by claim 10 wherein said control means comprises:
 a. a cylindrical sleeve rigidly coupled to, for rotation with, said rotatably mounted main operating shaft, said sleeve having a peripherally defined, helical groove;
 b. memory disc means disposed around, and mounted for reciprocal translation along, said sleeve;
 c. follower means having one end rigidly coupled with said memory disc means and having an opposed end received within said helical groove;
 d. means coupling said drum means with said memory disc means for rotating said disc means around said main operating shaft when said drum means is rotated;

e. first switch means for deactuating said drive means when said memory disc means reaches one location along said sleeve; and f. second switch means for preventing the releasing of said latch assembly means when said memory disc means to a second location laterally spaced from said one location.

12. Apparatus for sequentially opening and closing an electrical switch in response to respective first and second electrical command signals, said apparatus comprising:

a. a rotatably mounted main operating shaft having a mechanical linkage coupling said shaft with said electrical switch;

b. a stored energy mechanism for imparting torque to said main operating shaft, said stored energy mechanism comprising:
  i. first means surrounding, and adapted to rotate with respect to, said main operating shaft,
  ii. a spring assembly coupled between said first means and said main operating shaft for imparting torque to said shaft, and
  iii. drive means, when actuated, for rotating said first means with respect to said main operating shaft, thereby to increase the amount of torque applied to said shaft in proportion to the number of revolutions of said first means;

c. latch assembly means releasably restraining said operating shaft from rotation as well as limiting the degree of each discrete rotation of said shaft, when released from said restraining, to less than a complete revolution;

d. trip release means responsive to said respective first and second electrical command signals for releasing said latch assembly means from said restraining and for returning said latch assembly means to a restraining relationship when the main operating shaft has advanced through said limited degree of rotation; and e. control means responsive to the amount of rotation of said first means and said main operating shaft for deactuating said drive means when the number of revolutions of said first means exceeds, by a predetermined amount, the number of revolutions of said main operating shaft and for preventing the release of said latch assembly means by said trip release means when the number of revolutions of said main operating shaft exceeds, by a predetermined amount, the number of revolutions of said first means.

* * * * *

UNITED STATES PATENT OFFICE
CERTIFICATE OF CORRECTION

Patent No. 3,894,245                              Dated July 8, 1975

Inventor(s) Maurice A. Hogue, James E. McClain, Howard L. Scott

It is certified that error appears in the above-identified patent and that said Letters Patent are hereby corrected as shown below:

Column 10, Line 18, change "as" to --has--.

Column 11, Line 8, change "to" to --reaches--.

Signed and Sealed this thirtieth Day of September 1975

[SEAL]

Attest:

RUTH C. MASON
*Attesting Officer*

C. MARSHALL DANN
*Commissioner of Patents and Trademarks*